US011255381B2

(12) United States Patent
Akimoto et al.

(10) Patent No.: US 11,255,381 B2
(45) Date of Patent: Feb. 22, 2022

(54) ROLLING BEARING AND CAGE

(71) Applicant: JTEKT CORPORATION, Osaka (JP)

(72) Inventors: Shota Akimoto, Osaka (JP); Yuya Yamamoto, Osaka (JP); Masayuki Murakami, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/086,773

(22) Filed: Nov. 2, 2020

(65) Prior Publication Data
US 2021/0140477 A1   May 13, 2021

(30) Foreign Application Priority Data

Nov. 8, 2019   (JP) .............................. JP2019-203153

(51) Int. Cl.
*F16C 33/41*    (2006.01)
*F16C 33/38*    (2006.01)
*F16C 33/66*    (2006.01)
*F16C 19/16*    (2006.01)

(52) U.S. Cl.
CPC ............ *F16C 33/416* (2013.01); *F16C 19/16* (2013.01); *F16C 33/3806* (2013.01); *F16C 33/3887* (2013.01); *F16C 33/6614* (2013.01); *F16C 33/418* (2013.01)

(58) Field of Classification Search
CPC .... F16C 33/3806; F16C 33/41; F16C 33/412; F16C 33/414; F16C 33/416; F16C 33/418; F16C 33/6614; F16C 19/16; F16C 33/3887
See application file for complete search history.

(56) References Cited

U.S. PATENT DOCUMENTS

| | | | | |
|---|---|---|---|---|
| 6,533,462 | B2* | 3/2003 | Kawakami | F16C 33/414 384/470 |
| 10,527,095 | B1* | 1/2020 | Roffe | F16C 33/3862 |
| 2002/0126927 | A1* | 9/2002 | Compassi | F16C 33/416 384/470 |
| 2017/0204901 | A1* | 7/2017 | Kamamoto | F16C 33/3806 |
| 2017/0268570 | A1* | 9/2017 | Kamamoto | F16C 33/3806 |

FOREIGN PATENT DOCUMENTS

| | | | | |
|---|---|---|---|---|
| JP | 11210757 | A * | 8/1999 | ............ F16C 33/416 |
| JP | 2001082486 | A * | 3/2001 | ............ F16C 33/418 |
| JP | 2003-035317 | A | 2/2003 | |

\* cited by examiner

*Primary Examiner* — Alan B Waits
(74) *Attorney, Agent, or Firm* — Oliff PLC

(57) ABSTRACT

A rolling bearing includes an inner ring, an outer ring, a plurality of rolling elements, and a cage. The cage includes an annular body, a plurality of cage prongs, and guide portions placed inward of the cage prongs in the radial direction of the cage such that the guide portions extend from a radially inner part of the annular body toward a second side in the axial direction of the cage, the guide portions being configured to position the cage by making contact with an inner ring raceway. The cage has a groove so as to connect pockets adjacent to each other in the circumferential direction, the groove being configured such that lubricant is present in the groove and a groove width of the groove is increased in the radial direction in the center of the groove in the circumferential direction.

3 Claims, 8 Drawing Sheets

(SECOND SIDE) ←— AXIAL DIRECTION —→ (FIRST SIDE)

ROLLING BEARING AND CAGE

CROSS-REFERENCE TO RELATED APPLICATION

This application claims priority to Japanese Patent Application No. 2019-203153 filed on Nov. 8, 2019, incorporated herein by reference in its entirety.

BACKGROUND

1. Technical Field

The present disclosure relates to a rolling bearing and a cage.

2. Description of Related Art

A rolling bearing includes an inner ring, an outer ring, a plurality of rolling elements provided between the inner ring and the outer ring, and an annular cage. In a case of a ball bearing the rolling elements of which are balls, a so-called snap cage made of resin is used. The snap cage includes an annular body placed closer to a first side in the axial direction of the snap cage than the rolling elements, and a plurality of cage prongs. The cage prongs are provided to extend to a second side in the axial direction from the annular body. Japanese Unexamined Patent Application Publication No. 2003-35317 (JP 2003-35317 A) describes a rolling bearing including a snap cage.

SUMMARY

A rolling bearing is lubricated by lubricant such as grease. When the rolling bearing rotates particularly at a high speed, the lubricant may splash to an outer ring side by centrifugal force. In this case, the lubricant becomes insufficient on an inner ring side, so that a lubrication state might worsen.

In view of this, an object of this disclosure is to provide a rolling bearing that can restrain insufficiency in lubricant on the inner ring side, and a cage that enables the rolling bearing.

A rolling bearing according to a first aspect of this disclosure includes an inner ring, an outer ring, a plurality of rolling elements, and an annular cage. The inner ring includes an inner ring raceway on an outer periphery of the inner ring. An outer ring includes an outer ring raceway on an inner periphery of the outer ring. The rolling elements are provided between the inner ring raceway and the outer ring raceway. In the annular cage, the rolling elements are held at intervals in the circumferential direction of the cage. The cage includes: an annular body placed closer to a first side in an axial direction of the cage than the rolling elements; a plurality of cage prongs provided to extend from a radially outer part of the annular body toward a second side in the axial direction; and guide portions placed inward of the cage prongs in the radial direction of the cage such that the guide portions extend from a radially inner part of the annular body toward the second side in the axial direction, the guide portions being configured to position the cage by making contact with the inner ring raceway. Pockets in which the rolling elements are stored are provided such that each of the pockets is placed between the cage prongs adjacent to each other in the circumferential direction. The cage has a groove provided between each of the cage prongs and a corresponding one of the guide portions so as to connect the pockets adjacent to each other in the circumferential direction, the groove being configured such that lubricant is present in the groove and a groove width of the groove is increased in the radial direction in the center of the groove in the circumferential direction.

In the rolling bearing, the lubricant is retained in the groove between the cage prong and the guide portion, and the lubricant passes through the groove. The lubricant is present in the groove of the cage, and the lubricant is supplied from the groove to the inner ring side via the rolling element, thereby making it possible to restrain insufficiency in the lubricant on the inner ring side.

Further, a radially outer face of each of the guide portions may have a shape recessed in the center of the radially outer face in the circumferential direction. However, a radially inner face of each of the cage prongs may have a shape recessed in the center of the radially inner face in the circumferential direction. In this configuration, the groove between the cage prong and the guide portion has a shape the groove width of which is increased in the radial direction in the center of the groove in the circumferential direction. Further, the lubricant moves outwardly in the radial direction due to centrifugal force in the groove. Accordingly, in the above configuration, a high lubricant retention capacity is achieved.

Further, each of the cage prongs may include a lack portion provided from a first side of the each of the cage prongs to a second side of the each of the cage prongs in the axial direction such that the lack portion is opened to the second side in the axial direction and to an outer side in the radial direction. The each of the cage prongs may include a pair of cage prong bodies such that the cage prong bodies are provided on both sides of the lack portion in the circumferential direction, and a rib provided between the cage prong bodies and constituting a part of an outer wall, in the radial direction, of the groove. In this case, the lack portion is formed in the cage prong. Accordingly, the weight of the cage prong is reduced, thereby making it possible to decrease centrifugal force to be applied to the cage. Even when the cage prong is provided with the lack portion, the lubricant is retained in the groove provided inwardly from the lack portion in the radial direction.

Further, a cage according to a second aspect of this disclosure includes an annular body, a plurality of cage prongs, and guide portions. The annular body is placed closer to a first side in the axial direction of the cage than rolling elements provided in a rolling bearing. The cage prongs are provided to extend from a radially outer part of the annular body toward a second side in the axial direction. The guide portions are placed inward of the cage prongs in the radial direction of the cage such that the guide portions extend from a radially inner part of the annular body toward the second side in the axial direction, the guide portions being configured to position the cage by making contact with a raceway of an inner ring provided in the rolling bearing. Pockets in which the rolling elements are stored are provided such that each of the pockets is placed between the cage prongs adjacent to each other in the circumferential direction of the cage. The cage has a groove provided between each of the cage prongs and a corresponding one of the guide portions so as to connect the pockets adjacent to each other in the circumferential direction, the groove being configured such that lubricant is present in the groove and a groove width of the groove is increased in the radial direction in the center of the groove in the circumferential direction.

In the cage, the lubricant is retained in the groove between the cage prong and the guide portion, and the lubricant passes through the groove. The lubricant is present in the groove of the cage, and the lubricant is supplied from the groove to the inner ring side of the rolling bearing via the rolling element, thereby making it possible to restrain insufficiency in the lubricant on the inner ring side.

With the aspects of this disclosure, it is possible to restrain insufficiency in the lubricant on the inner ring side of the rolling bearing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
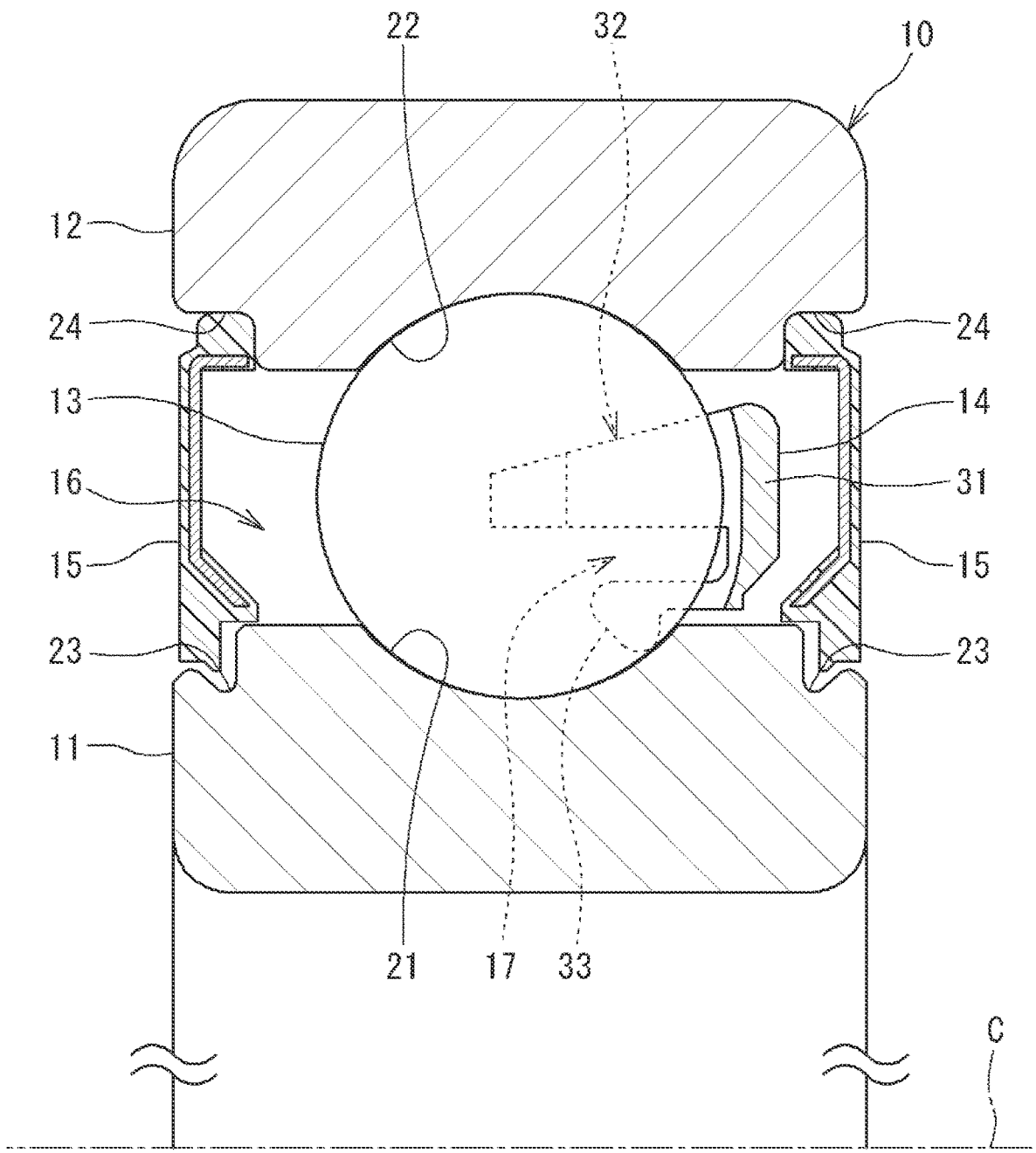
FIG. 1 is a sectional view of a rolling bearing.

FIG. 1 is a sectional view of a rolling bearing. The rolling bearing 10 illustrated in FIG. 1 includes an inner ring 11, an outer ring 12, a plurality of rolling elements provided between the inner ring 11 and the outer ring 12, and an annular cage 14. The rolling elements in this disclosure are balls 13, and the rolling bearing 10 is a ball bearing (deep groove ball bearing). The rolling bearing 10 in this disclosure uses grease as lubricant. Note that the lubricant may be oil. FIG. 1 illustrates a section including a center line C (also referred to as a "bearing center line C") of the rolling bearing 10.

In this disclosure, a direction along the center line C of the rolling bearing 10 corresponds to the axial direction of the rolling bearing 10 and is just referred to as the "axial direction." The axial direction also includes a direction parallel to the center line C. The right side in FIG. 1 is defined as a first side in the axial direction, and the left side in FIG. 1 is defined as a second side in the axial direction. A direction perpendicular to the bearing center line C corresponds to the radial direction of the rolling bearing 10 and is just referred to as the "radial direction." A direction where the rolling bearing 10 (the inner ring 11 in this disclosure) rotates around the bearing center line C corresponds to the circumferential direction of the rolling bearing 10 and is just referred to as the "circumferential direction."

The rolling bearing 10 illustrated in FIG. 1 further includes seals 15 on both sides of the rolling bearing 10 in the axial direction. The seal 15 prevents grease in an annular space 16 (also referred to as "bearing inside") formed between the inner ring 11 and the outer ring 12 from leaking outside (bearing outside). Further, the seal 15 also has a function to prevent foreign matter in the bearing outside from entering the bearing inside.

The inner ring 11 is an annular member, and an inner ring raceway 21 with which the balls 13 make rolling contact is formed on the outer periphery of the inner ring 11. In the section illustrated in FIG. 1, the inner ring raceway 21 is constituted by a groove formed in a recessed arcuate shape having a radius slightly larger than the radius of the balls 13. Respective recessed grooves 23 are formed on respective outer peripheral surfaces of both side portions of the inner ring 11 in the axial direction. The recessed grooves 23 face respective inner peripheral portions of the seals 15 via respective gaps. Labyrinth gaps are constituted by the gaps.

The outer ring 12 is an annular member, and an outer ring raceway 22 with which the balls 13 make rolling contact is formed on the inner periphery of the outer ring 12. In the section illustrated in FIG. 1, the outer ring raceway 22 is constituted by a groove formed in a recessed arcuate shape having a radius slightly larger than the radius of the balls 13. Respective sealing grooves 24 are formed on respective inner peripheral surfaces of both side portions of the outer ring 12 in the axial direction. Respective outer peripheral portions of the seals 15 are attached to the sealing grooves 24.

The balls 13 are provided between the inner ring raceway 21 and the outer ring raceway 22. When the rolling bearing 10 (the inner ring 11) rotates, the balls 13 roll on the inner ring raceway 21 and the outer ring raceway 22.

Figure 2:
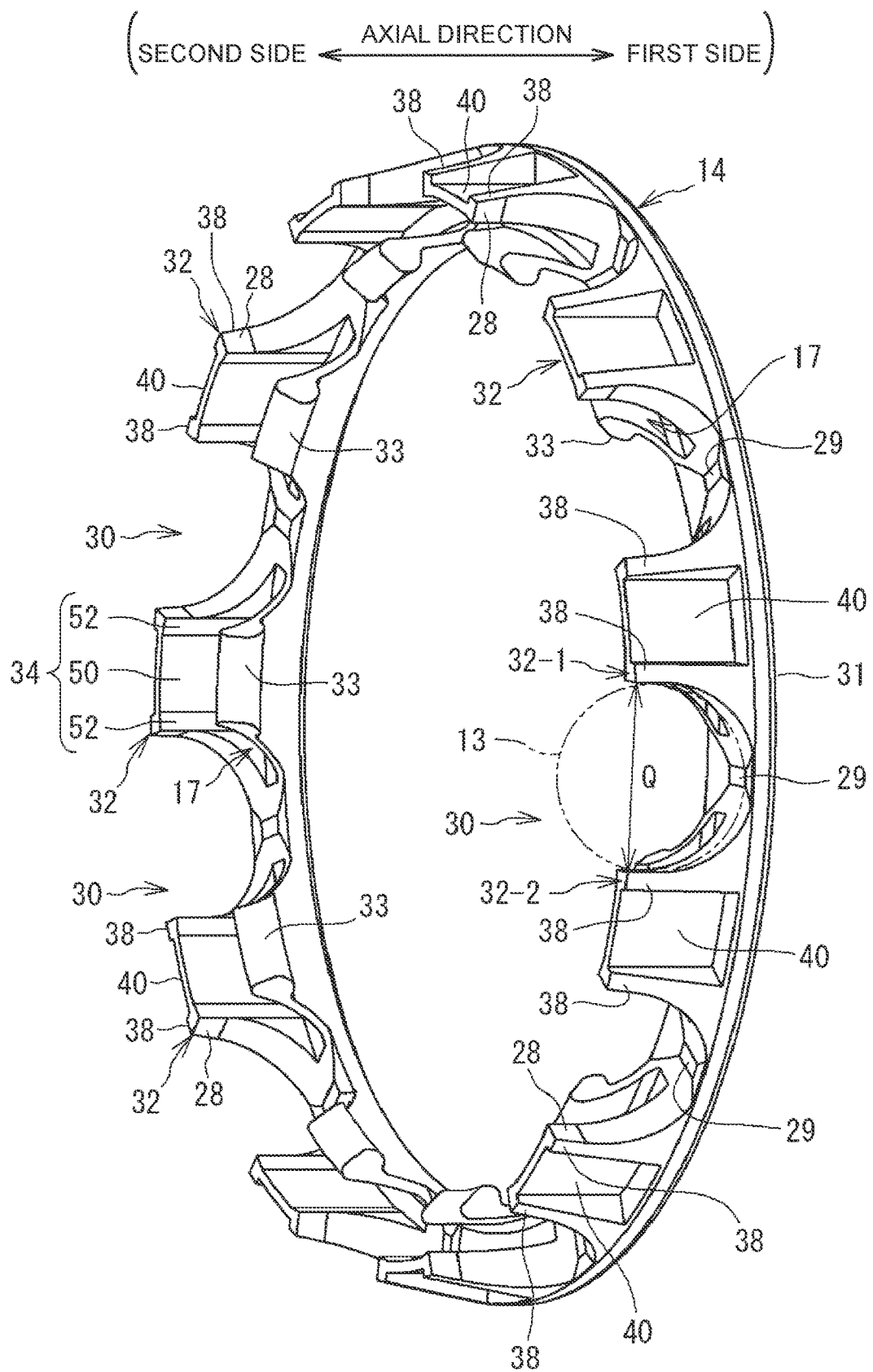
FIG. 2 is a perspective view of a cage.
Figure 3:
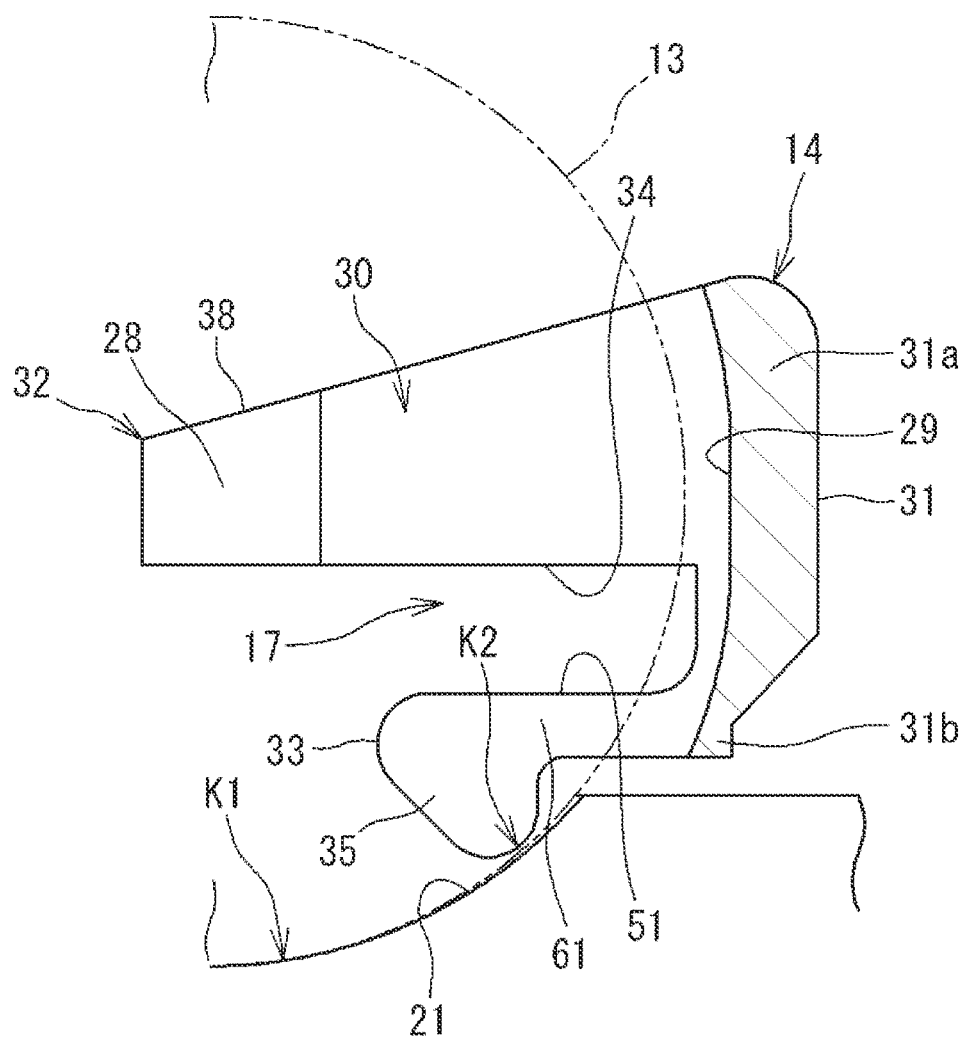
FIG. 3 is a sectional view illustrating the cage and its peripheral area.

FIG. 2 is a perspective view of the cage 14. FIG. 3 is a sectional view illustrating the cage 14 and its peripheral area. The cage 14 includes an annular body (annular portion) 31, a plurality of cage prongs (pillar portions) 32, and guide portions 33. The annular body 31 is a part having an annular shape and is placed closer to the first side in the axial direction than the balls 13. All the cage prongs 32 have the same shape. The cage prongs 32 are provided to extend from a radially outer part 31a (see FIG. 3) of the annular body 31 toward the second side in the axial direction. A space between the cage prongs 32 provided in a pair so as to be adjacent to each other in the circumferential direction, the space being formed on the second side in the axial direction from the annular body 31, serves as a pocket 30 in which the ball 13 is stored. A plurality of pockets 30 is formed along the circumferential direction.

The guide portions 33 are provided inward of the cage prongs 32 in the radial direction. The guide portions 33 are provided to extend from a radially inner part 31b of the annular body 31 toward the second side in the axial direction. A gap in the radial direction is provided between the cage prong 32 and the guide portion 33. The gap serves as a groove 17 that connects the pockets 30 provided in a pair so as to be adjacent to each other in the circumferential direction.

Hereby, the cage 14 can hold the balls 13 at intervals in the circumferential direction. A part (a cage prong body 38 (described later)) of the cage prong 32, the part having a surface 28 facing the circumferential direction, serves as a first part of the pocket 30. The surface 28 is parallel to a virtual plane including the bearing center line C and the center of the pocket 30, and the surfaces 28 facing each other are provided at the same distance from the virtual plane. The ball 13 can make contact with the surfaces 28. A part of the annular body 31, the part having a surface 29 facing the second side in the axial direction, serves as a second part of the pocket 30. The surface 29 is a plane along a surface perpendicular to the bearing center line C. The ball 13 can make contact with the surface 29. The cage 14 is made of resin (synthetic resin) such as polyamide, for example, and is manufactured by injection molding. The annular body 31, the cage prongs 32, and the guide portions 33 are molded integrally, and the cage 14 is constituted by a single member.

The following further describes the guide portion 33. The guide portion 33 is provided to extend from the radially inner part 31b (see FIG. 3) of the annular body 31 toward the second side in the axial direction. The guide portion 33 includes a guide portion body 61 connected to the annular body 31 and a projecting portion 35 provided on the inner side, in the radial direction, of a second-side part of the guide portion body 61 in the axial direction. The projecting portion 35 projects toward the inner ring 11 side. Part of the projecting portion 35 can make contact with the inner ring raceway 21.

In a state where the center line of the cage 14 coincides with the bearing center line C (in a state of FIG. 3), a gap is formed between the projecting portion 35 and the inner ring raceway 21. When the cage 14 is displaced in the radial direction from this state, the projecting portion 35 makes contact with the inner ring raceway 21 from the radial direction. Hereby, the displacement of the cage 14 in the radial direction is restricted. When the cage 14 is displaced to the first side in the axial direction from the state of FIG. 3, the projecting portion 35 makes contact with the inner ring raceway 21 from the axial direction. Hereby, the displacement of the cage 14 to the first side in the axial direction is restricted. Note that, when the cage 14 is displaced to the second side in the axial direction from the state of FIG. 3, the surface 29 of the annular body 31 makes contact with the ball 13. Hereby, the displacement of the cage 14 to the second side in the axial direction is restricted.

Thus, the guide portion 33 has a function to restrict the movement of the cage 14 in the radial direction and the axial direction. That is, the guide portion 33 positions the cage 14 by making contact with the inner ring raceway 21. When the guide portion 33 makes contact (slide contact) with the inner ring raceway 21, the rotation of the cage 14 is guided. That is, the cage 14 in this disclosure serves as a raceway-guide cage (inner-ring-raceway guide cage).

Figure 4:
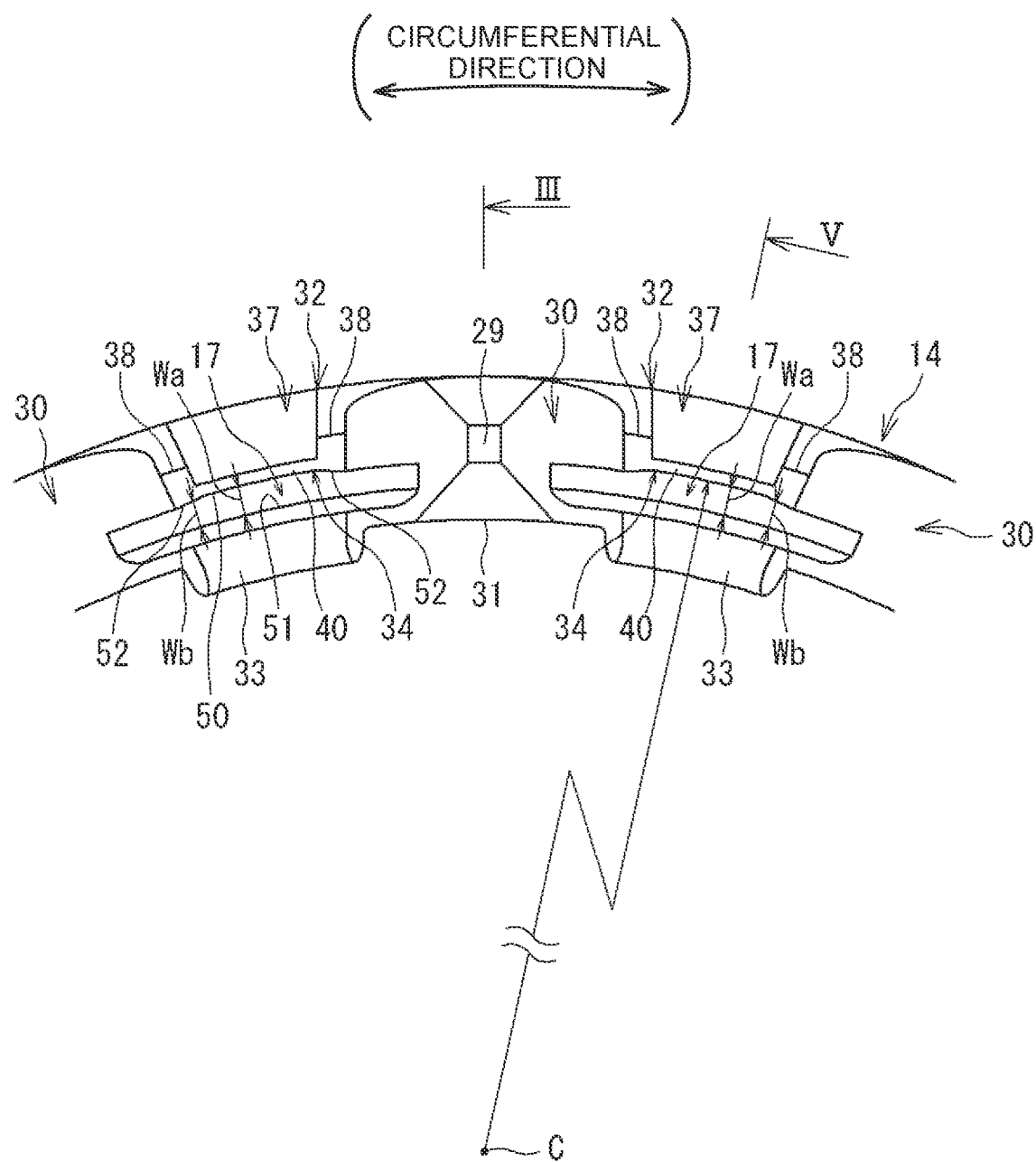
FIG. 4 is an enlarged view of part of the cage viewed from a second side in the axial direction.
Figure 5:
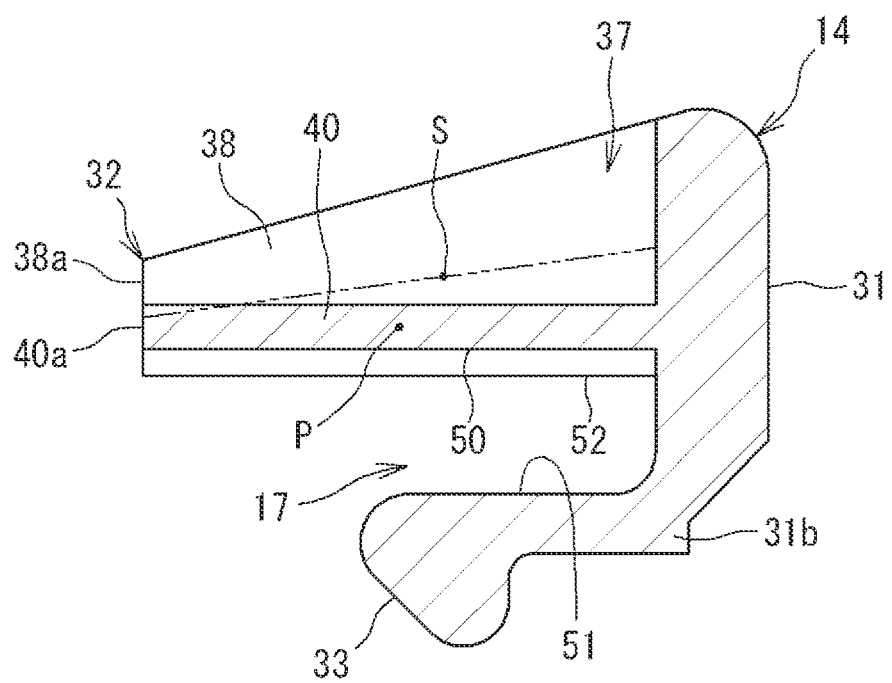
FIG. 5 is a sectional view taken along an arrow V in FIG. 4.
Figure 6:
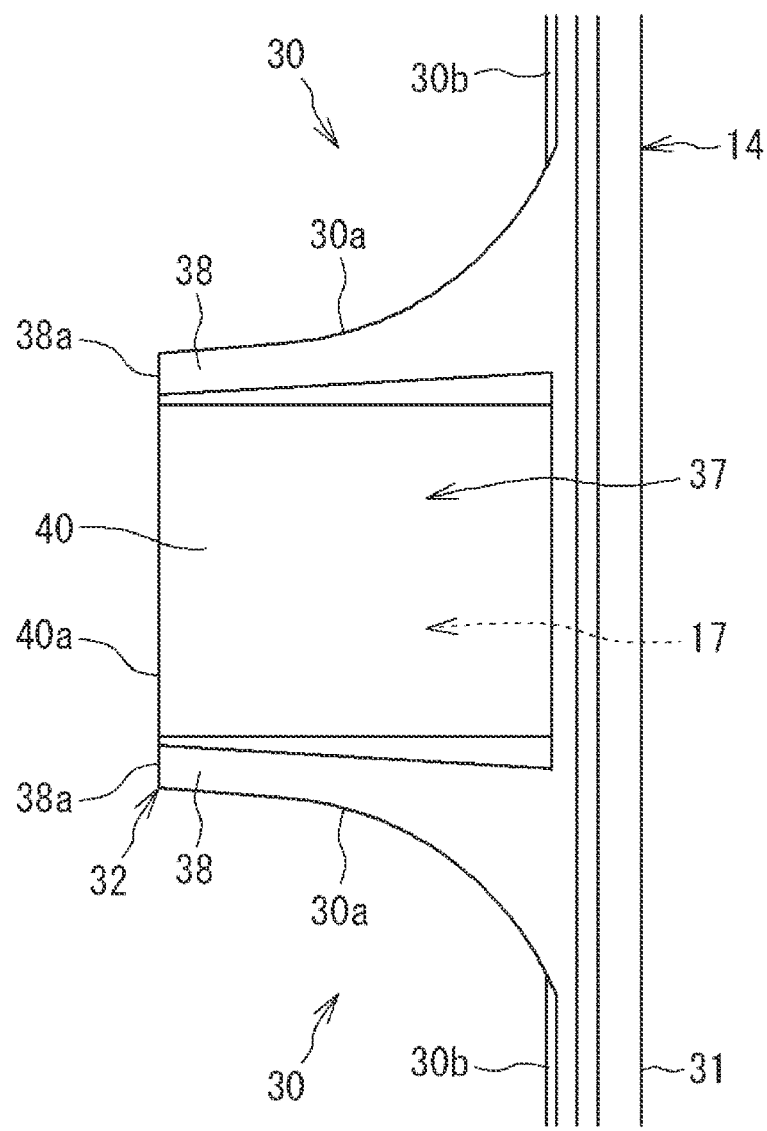
FIG. 6 is an enlarged view of part of the cage viewed from outside in the radial direction.

FIG. 4 is an enlarged view of part of the cage 14 viewed from the second side in the axial direction. FIG. 5 is a section view taken along an arrow V in FIG. 4. Note that FIG. 3 is a sectional view taken along an arrow III in FIG. 4. FIG. 6 is an enlarged view of part of the cage 14 viewed from outside in the radial direction. As illustrated in FIGS. 4, 5, 6, the cage prong 32 includes a lack portion 37. The lack portion 37 is provided from the first side of the cage prong 32 to the second side thereof in the axial direction such that the lack portion 37 is opened to the second side in the axial direction and to the outer side in the radial direction.

Since the lack portion 37 is provided, the cage prong 32 includes a pair of cage prong bodies (pillar bodies) 38 such that the cage prong bodies 38 are provided on both sides of the lack portion 37 in the circumferential direction. Each of the cage prong bodies 38 constitutes a first part 30a of the pocket 30 (see FIG. 6). Note that a remaining second part 30b of the pocket 30 is constituted by the annular body 31. A rib 40 is provided between the cage prong bodies 38. The rib 40 has a plate shape having a radial dimension smaller than that of the cage prong body 38.

As illustrated in FIG. 6, the rib 40 is provided in the lack portion 37 and connects the annular body 31 to the cage prong bodies 38. The rib 40 is provided at a position closer to the inner side in the radial direction between the cage prong bodies 38 (see FIGS. 4, 5). The rib 40 (a gravitational center P of the rib 40) is provided radially inward of a center line S (see FIG. 5), in the radial direction, of the cage prong body 38. As illustrated in FIG. 6, a side face 40a of the rib 40 on the second side in the axial direction and a side face 38a of the cage prong body 38 on the second side in the axial direction are present on the same plane. The plane is a plane perpendicular to the bearing center line C. The rib 40 covers the groove 17 from the outer side in the radial direction, so that grease in the groove 17 is hard to escape outwardly in the radial direction.

As illustrated in FIG. 4, the groove 17 connects the pockets 30 provided in a pair so as to be adjacent to each other in the circumferential direction. The groove 17 is a recessed groove in which grease (lubricant) can be present. The groove 17 is a space surrounded by the cage prong 32 and the guide portion 33 in the radial direction. The groove 17 is opened to the second side in the axial direction, and the first side of the groove 17 in the axial direction is closed by the annular body 31. The groove width of the groove 17 is increased in the radial direction in the center of the groove 17 in the circumferential direction. In FIG. 4, the dimension of the groove width in the center of the groove 17 in the circumferential direction is "Wa," and the dimension of the groove width on each side of the groove 17 in the circumferential direction is "Wb." The groove width satisfies Wa>Wb.

The guide portion 33 constitutes an inner wall, in the radial direction, of the groove 17. The rib 40 constitutes a first part of an outer wall, in the radial direction, of the groove 17, and the cage prong bodies 38 on both sides of the rib 40 constitute a second part (remaining part) of the outer wall, in the radial direction, of the groove 17. A radially outer face 51 of the guide portion 33 has a shape along a cylindrical surface around the bearing center line C. A radially inner face 50 of the rib 40 has a shape along the cylindrical surface around the bearing center line C. A radially inner face 52 of each of the cage prong bodies 38 on both sides in the circumferential direction has an inclination shape the distance of which from the bearing center line C increases as it gets closer to the radially inner face 50 of the rib 40.

Figure 7:
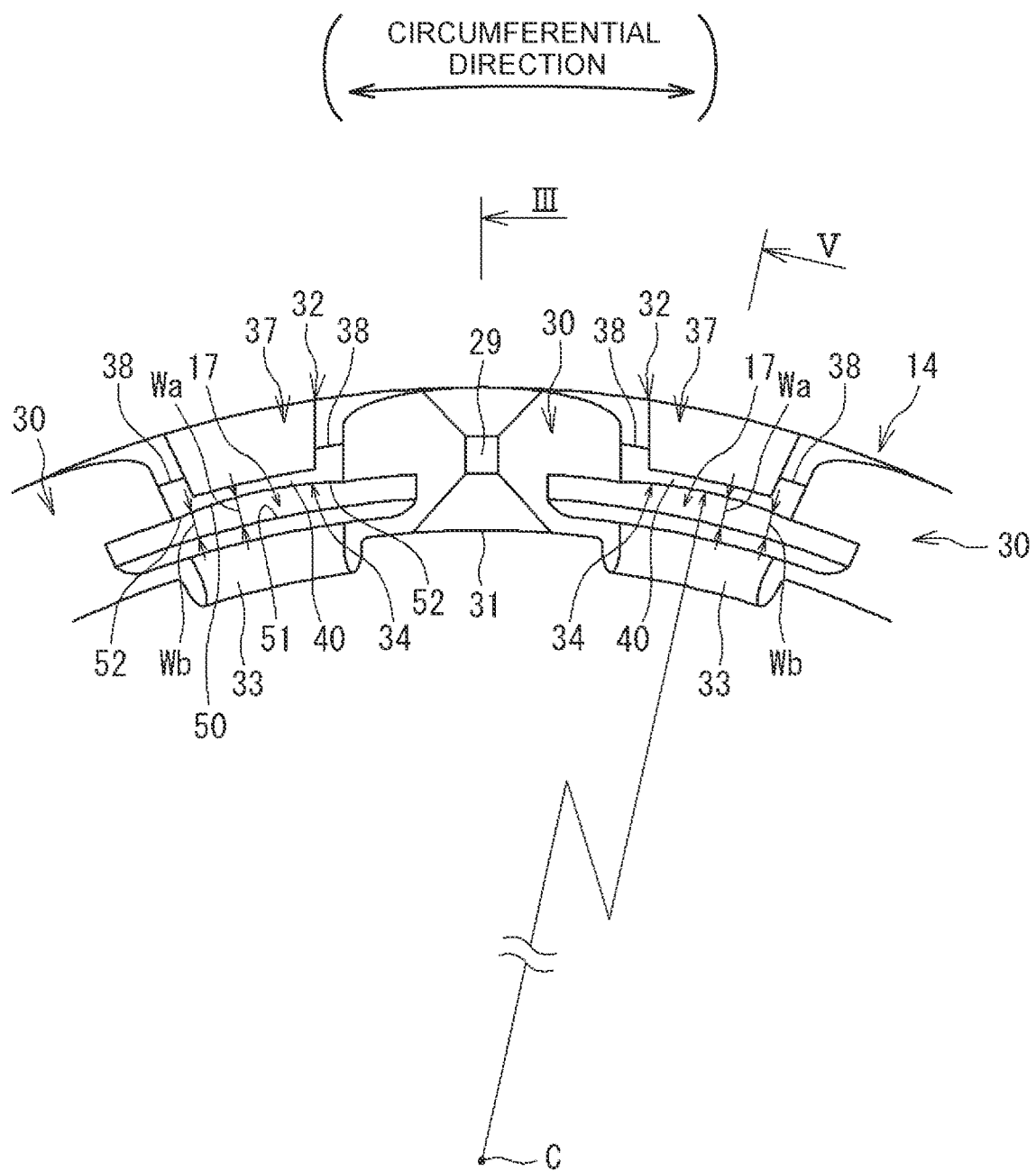
FIG. 7 is an enlarged view of part of the cage viewed from the second side in the axial direction and illustrates a modification of a groove.

Thus, the radially inner face 34 of the cage prong 32 has a shape recessed in the center of the radially inner face 34 in the circumferential direction, and the groove 17 has a shape the groove width of which is increased in the radial direction in the center of the groove 17 in the circumferential direction. Note that, as illustrated in FIG. 7, the radially inner face 34 of the cage prong 32 may have a shape along one cylindrical surface. That is, the radially inner face 50 of the rib 40 and the radially inner face 52 of the cage prong body 38 are provided along one cylindrical surface. In this case, the cylindrical surface has a radius smaller than that of the radially outer face 51 of the guide portion 33. Hereby, the radially inner face 34 of the cage prong 32 has a shape recessed in the center of the radially inner face 34 in the circumferential direction, and the groove 17 has a shape the groove width of which is increased in the center of the groove 17 in the circumferential direction.

Now, focus on the cage prongs 32 provided on both sides in the circumferential direction across one pocket 30 in which the ball 13 is stored in FIG. 2. One of the cage prongs 32 is referred to as a first cage prong 32-1, and the other one of them is referred to as a second cage prong 32-2. A distance Q between respective distal ends, on the second side in the axial direction, of the cage prongs 32-1, 32-2 provided in a pair so as to be adjacent to each other in the circumferential direction is larger than the diameter of the ball 13.

On this account, when the cage 14 is to be displaced to the first side in the axial direction, the displacement of the cage 14 is not restricted by the ball 13. In view of this, the guide portion 33 of the cage 14 can make contact with the inner ring raceway 21 from the axial direction, as described above (see FIG. 1). On this account, the cage 14 does not fall off from between the inner ring 11 and the outer ring 12.

Note that, in a case of a general deep groove ball bearing, a so-called snap cage is used. The snap cage includes a detent portion on a distal end side of a cage prong, and the distance between detent portions of cage prongs provided in a pair so as to be adjacent to each other in the circumferential direction is smaller than the diameter of a ball. In this configuration, an axial movement of the snap cage is restricted by the ball, so that the cage does not fall off from between an inner ring and an outer ring. Differently from such a snap cage, the cage 14 in this disclosure is not provided with the detent portions the distance between which is smaller than the diameter of the ball, the detent portions being provided in the general snap cage. Since the detent portions are not provided, the cage prongs 32 can be shortened in the cage 14 in this disclosure, so that the cage 14 is reduced in weight.

As described above, in the rolling bearing 10 in this disclosure, the cage 14 includes the annular body 31, the cage prongs 32, and the guide portions 33 placed inward of the cage prongs 32 in the radial direction. The guide portions 33 position the cage 14 such that the projecting portions 35 provided in the guide portions 33 make contact with the inner ring raceway 21. The pocket 30 in which the ball 13 is stored is provided between the cage prongs 32 adjacent to each other in the circumferential direction. The groove 17 that connects the pockets 30 adjacent to each other in the circumferential direction is provided between the cage prong 32 and the guide portion 33. Grease can be present in the groove 17, and the groove width of the groove 17 is increased in the radial direction in the center of the groove 17 in the circumferential direction (see FIGS. 4, 7).

Figure 8:
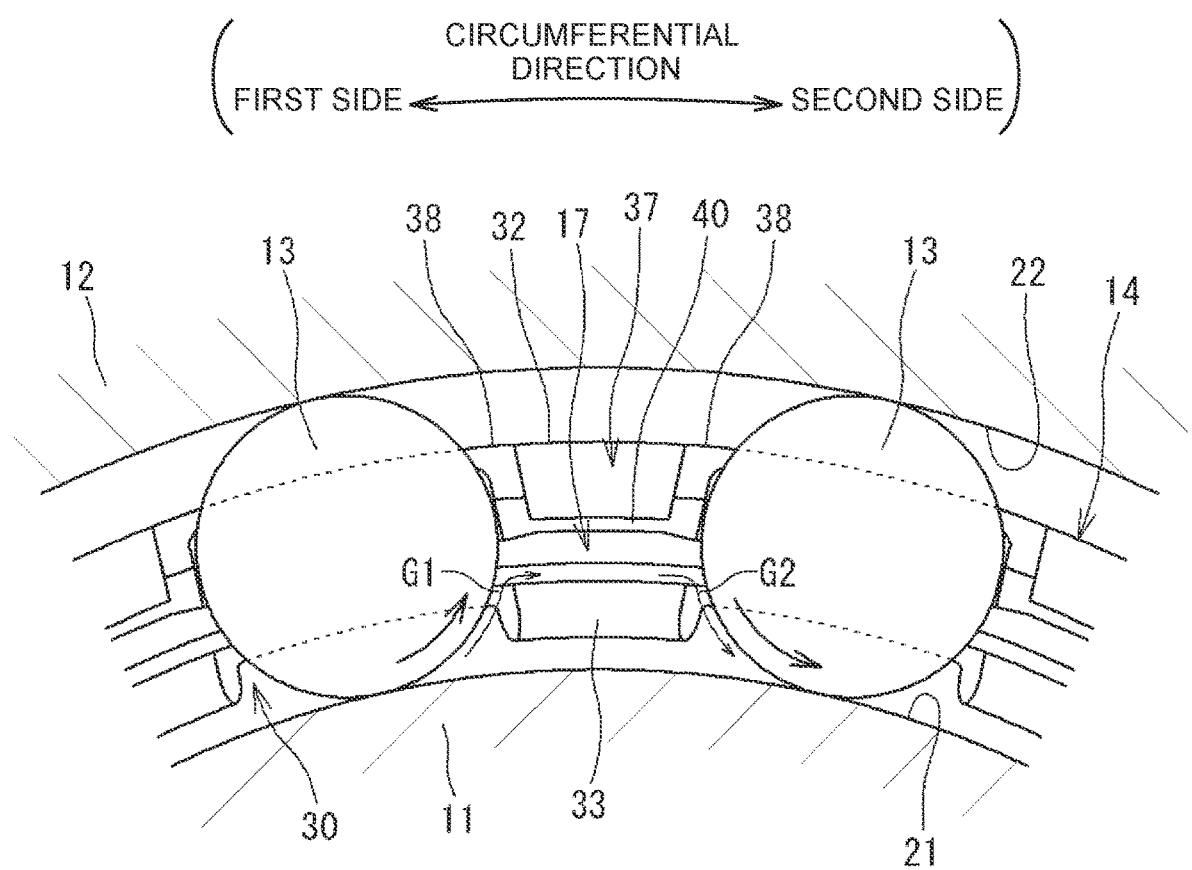
FIG. 8 is a view to describe the flow of grease.

When the rolling bearing 10 (the inner ring 11) rotates at a high speed, the grease present in the inner ring raceway 21 is to move to the outer ring 12 side by centrifugal force. However, in the above configuration, the grease is received by the cage prong 32, so that the grease is retained in the groove 17 between the cage prong 32 and the guide portion 33, and the grease passes through the groove 17. That is, the grease is present in the groove 17 of the cage 14. FIG. 8 is a view to describe the flow of the grease. When the outer ring 12 is fixed in FIG. 8 and the inner ring 11 rotates clockwise (to a second side in the circumferential direction), the balls 13 revolve along the inner ring raceway 21 and the outer ring raceway 22 while the balls 13 rotate on their respective axes. Hereby, the grease enters the groove 17 from the ball 13 and the pocket 30 on a first side (the left side in FIG. 8) in the circumferential direction. The movement of the grease is indicated by an arrow G1.

A part of the grease thus entering the groove 17 stays in the groove 17, and another part of the grease passes through the groove 17 to the second side (the right side in FIG. 8) in the circumferential direction. The grease thus passing through the groove 17 is attached onto the surface of the ball 13 on the second side in the circumferential direction. The grease thus attached to the surface moves to the inner ring raceway 21 side due to the autorotation of the ball 13. The movement of the grease is indicated by an arrow G2. As such, the grease is supplied from the groove 17 to the inner ring 11 side via the ball 13, thereby making it possible to restrain insufficiency in lubricant on the inner ring 11 side. As a result, it is possible to achieve a longer operating life of the rolling bearing 10. Particularly, the rolling bearing 10 (the cage 14) in this disclosure is suitable for high speed rotation. Note that, as described above, the grease may be supplied from the groove 17 to the inner ring 11 side, but base oil included in the grease retained in the groove 17 may be supplied to the inner ring 11 side via the ball 13.

With reference to FIG. 4, since the groove 17 between the cage prong 32 and the guide portion 33 has a shape the groove width of which is increased in the radial direction in the center of the groove 17 in the circumferential direction, the radially outer face 51 of the guide portion 33 may have a shape recessed in the center of the radially outer face 51 in the circumferential direction (not shown). However, since the grease moves outwardly in the radial direction due to centrifugal force in the groove 17, the radially inner face 34 of the cage prong 32 has a shape recessed in the center of the radially inner face 34 in the circumferential direction in this disclosure. With this configuration, a high grease retention capacity in the groove 17 is achieved in comparison with a case where the radially outer face 51 of the guide portion 33 has a shape recessed in the center of the radially outer face 51 in the circumferential direction.

In the cage 14 in this disclosure, the cage prong 32 includes the lack portion 37 as described above. On this account, the weight of the cage prong 32 is reduced, thereby making it possible to decrease centrifugal force to be applied to the cage prong 32. As a result, the cage 14 can hardly deform. The cage prong 32 includes the rib 40 provided between the cage prong bodies 38. The rib 40 constitutes the first part of the outer wall, in the radial direction, of the groove 17. On this account, even when the cage prong 32 is provided with the lack portion 37, the grease is retained in the groove 17 provided inwardly from the lack portion 37 in the radial direction because the rib 40 is present as a wall.

Further, when the rolling bearing 10 rotates, the ball 13 makes contact with the cage prong 32 (the cage prong body 38) from the circumferential direction due to movement delay or the like. The strength of the cage prong 32 decreases due to the lack portion 37, but the rib 40 can prevent the decrease in the strength of the cage prong 32. That is, the rigidity, in the circumferential direction, of the cage prong 32 provided with the lack portion 37 is increased by the rib 40. As such, the cage prong 32 can hardly deform by centrifugal force by reducing the weight of the cage prong 32, and the decrease in the strength of the cage prong 32 can be prevented by the rib 40.

In this disclosure, the cage 14 includes the guide portions 33. The guide portions 33 position the cage 14 by making contact with the inner ring raceway 21 (see FIG. 1). That is, the guide portions 33 restrict the movement of the cage 14 in the radial direction and the axial direction and guide the rotation of the cage 14. Since the balls 13 make rolling contact with the inner ring raceway 21, machining such as grinding is performed on the inner ring raceway 21, for example. When the guide portions 33 are brought into contact with the inner ring raceway 21 configured as such, the cage 14 is stably guided.

Since the rotation of the cage 14 is guided by the inner ring 11, the cage 14 is placed closer to the inner ring 11. This makes it possible to decrease the outside diameter of the cage 14. The centrifugal force is decreased as any of the mass of the cage 14, the angular velocity thereof, and the distance (radius) thereof from the rotation center is reduced. Accordingly, in the cage 14 in this disclosure, since the cage 14 is placed closer to the inner ring 11, the centrifugal force to be applied to the cage 14 can be further decreased.

Since the cage 14 is an inner ring guide cage, the gap between the pocket 30 and the ball 13 can be set to be wide as compared with a rolling element guide cage that is guided by balls (not shown). Accordingly, even when the cage prong 32 of the cage 14 elastically deforms due to the centrifugal force, the ball 13 partially makes contact with the pocket 30, thereby making it possible to prevent the cage 14 from being worn unevenly.

The embodiment described herein is just an example in all respects and is not limitative. The scope of the present disclosure is not limited to the above embodiment and includes all modifications made within a range equivalent to the configurations described in the scope of Claims. The above embodiment deals with a case where the rolling bearing is a deep groove ball bearing, but the rolling bearing may be an angular contact ball bearing.

What is claimed is:

1. A rolling bearing comprising:
   an inner ring including an inner ring raceway on an outer periphery of the inner ring;
   an outer ring including an outer ring raceway on an inner periphery of the outer ring;
   a plurality of rolling elements provided between the inner ring raceway and the outer ring raceway; and
   an annular cage in which the rolling elements are held at intervals in a circumferential direction of the cage, wherein:
   the cage includes
      an annular body placed closer to a first side in an axial direction of the cage than the rolling elements,
      a plurality of cage prongs provided to extend from a radially outer part of the annular body toward a second side in the axial direction, and
      guide portions placed inward of the cage prongs in a radial direction of the cage such that the guide portions extend from a radially inner part of the annular body toward the second side in the axial direction, the guide portions being configured to position the cage by making contact with the inner ring raceway;
      pockets in which the rolling elements are stored are provided such that each of the pockets is placed between the cage prongs adjacent to each other in the circumferential direction; and
      a groove provided between each of the cage prongs and a corresponding one of the guide portions so as to connect the pockets adjacent to each other in the circumferential direction, the groove being configured such that lubricant is present in the groove and a groove width of the groove is increased in the radial direction in a center of the groove in the circumferential direction, wherein:
      each of the cage prongs includes a lack portion provided from a first side of the each of the cage prongs to a second side of the each of the cage prongs in the axial direction such that the lack portion is opened to the second side in the axial direction and to an outer side in the radial direction, and
      the each of the cage prongs includes
         a pair of cage prong bodies such that the cage prong bodies are provided on both sides of the lack portion in the circumferential direction, and
         a rib provided between the cage prong bodies and constituting a part of an outer wall, in the radial direction, of the groove.

2. The rolling bearing according to claim 1, wherein a radially inner face of each of the cage prongs has a shape recessed in a center of the radially inner face in the circumferential direction.

3. A cage comprising:
   an annular body placed closer to a first side in an axial direction of the cage than rolling elements provided in a rolling bearing;
   a plurality of cage prongs provided to extend from a radially outer part of the annular body toward a second side in the axial direction;
   guide portions placed inward of the cage prongs in a radial direction of the cage such that the guide portions extend from a radially inner part of the annular body toward the second side in the axial direction, the guide portions being configured to position the cage by making contact with a raceway of an inner ring provided in the rolling bearing;
   pockets in which the rolling elements are stored are provided such that each of the pockets is placed between the cage prongs adjacent to each other in a circumferential direction of the cage; and
   a groove provided between each of the cage prongs and a corresponding one of the guide portions so as to connect the pockets adjacent to each other in the circumferential direction, the groove being configured such that lubricant is present in the groove and a groove width of the groove is increased in the radial direction in a center of the groove in the circumferential direction, wherein:
   each of the cage prongs includes a lack portion provided from a first side of the each of the cage prongs to a second side of the each of the cage prongs in the axial direction such that the lack portion is opened to the second side in the axial direction and to an outer side in the radial direction, and
   the each of the cage prongs includes
      a pair of cage prong bodies such that the cage prong bodies are provided on both sides of the lack portion in the circumferential direction, and
      a rib provided between the cage prong bodies and constituting a part of an outer wall, in the radial direction, of the groove.

* * * * *